No. 688,874. Patented Dec. 17, 1901.
T. F. McCULLOUGH.
CHECK BOX.
(Application filed Feb. 1, 1901.)

(No Model.) 2 Sheets—Sheet 1.

WITNESSES:
Edward Thorpe
B. Owens

INVENTOR
Thomas F. McCullough
BY
ATTORNEYS

THE NORRIS PETERS CO., PHOTO-LITHO., WASHINGTON, D. C.

No. 688,874. Patented Dec. 17, 1901.
T. F. McCULLOUGH.
CHECK BOX.
(Application filed Feb. 1, 1901.)
(No Model.) 2 Sheets—Sheet 2.
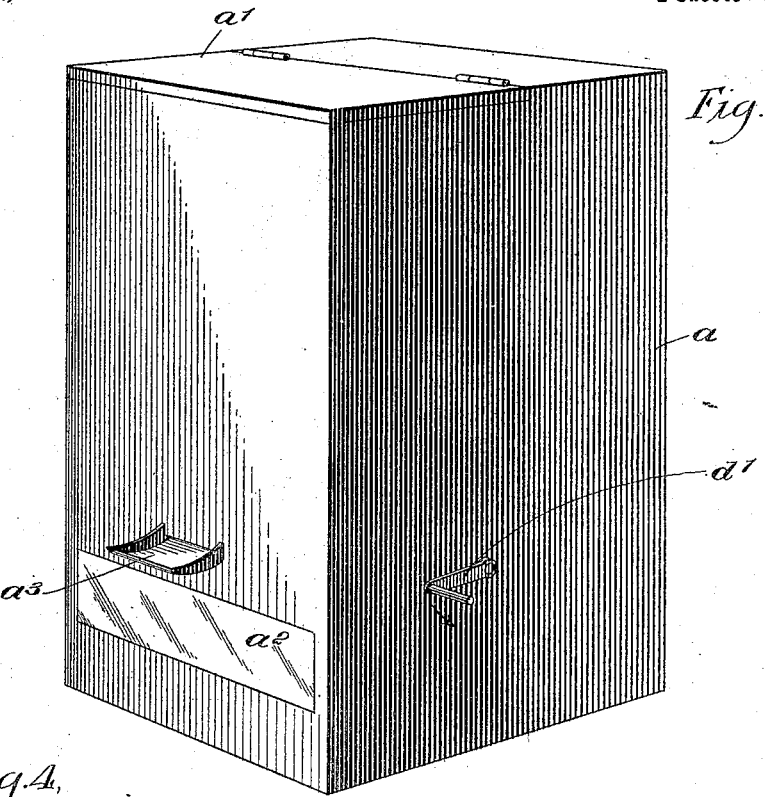
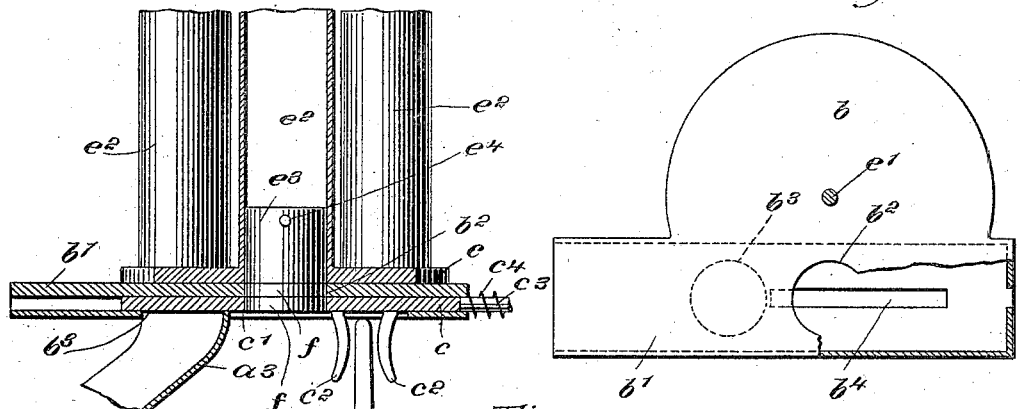
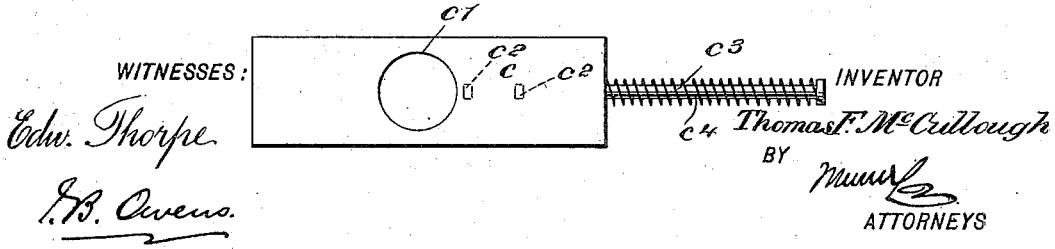
WITNESSES: Edw. Thorpe. J. B. Owens.
INVENTOR Thomas F. McCullough
BY
ATTORNEYS

UNITED STATES PATENT OFFICE.

THOMAS FRANCES McCULLOUGH, OF MEMPHIS, TENNESSEE.

CHECK-BOX.

SPECIFICATION forming part of Letters Patent No. 688,874, dated December 17, 1901.

Application filed February 1, 1901. Serial No. 45,580. (No model.)

*To all whom it may concern:*

Be it known that I, THOMAS FRANCES MC-CULLOUGH, a citizen of the United States, and a resident of Memphis, in the county of Shelby and State of Tennessee, have invented a new and Improved Check-Box, of which the following is a full, clear, and exact description.

This invention relates to a device for holding and successively delivering consecutively-numbered checks. The device is adapted especially for use in barber-shops, physicians' offices, and other places where customers or clients enter and are served in their turn, and by means of the device each person on entering the waiting-room may secure a check, and these checks, running consecutively, will settle all questions concerning the relative times of arrival.

This specification is a specific description of one form of the invention, while the claims are definitions of the actual scope thereof.

Reference is to be had to the accompanying drawings, forming a part of this specification, in which similar characters of reference indicate corresponding parts in all the views.

Figure 1:
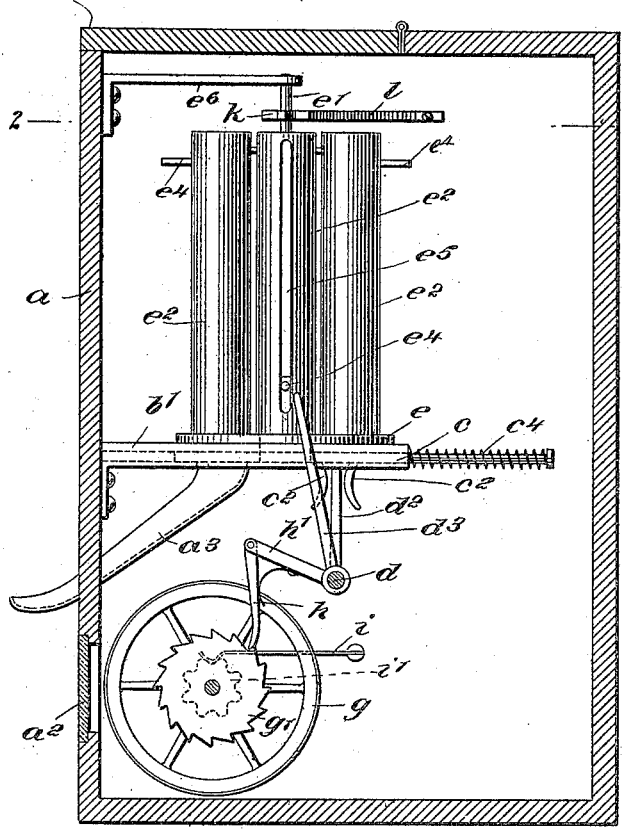
Figure 2:
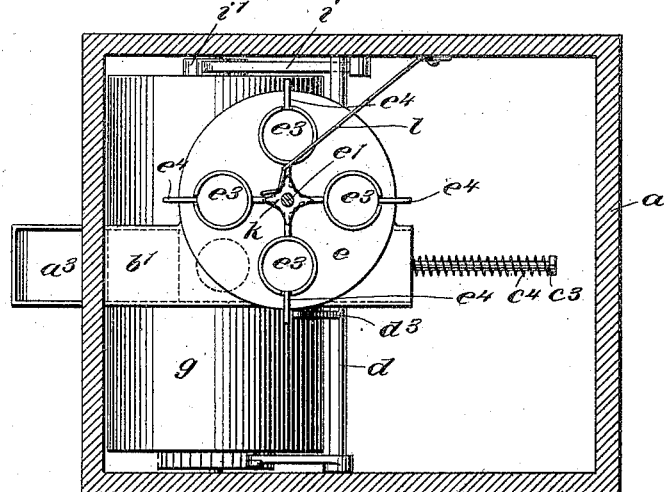

Figure 1 is a vertical section of the invention with parts in section. Fig. 2 is a sectional plan view on the line 2 2 of Fig. 1. Fig. 3 is a perspective view of the exterior of the box. Fig. 4 is a detail section showing the manner of discharging the checks. Fig. 5 is a fragmentary plan view of the guide in which is carried the delivery-slide, and Fig. 6 is a plan view of the said slide.

$a$ represents the box or casing, which may be provided with a lid $a'$ at its top to permit reaching the interior of the box. The front wall of the box has a glass panel $a^2$ therein, and a delivery-chute $a^3$ projects from the interior of the casing outward at the front side thereof, as shown best in Figs. 1 and 3. Rigidly supported within the casing $a$ is a base-plate $b$, having a slide or guideway $b'$ attached thereto or formed integral therewith, as desired. This guideway is provided with a circular opening $b^2$ in its top and a corresponding opening $b^3$ in its bottom, the opening $b^3$ being out of registry with the opening $b^2$ and communicating with the chute $a^3$, so as to discharge the checks into said chute. Fitted within the guideway $b'$ is the slide $c$, which is in the form of a plate and which is provided with an opening $c'$ therein capable of registering as the slide moves, first with the opening $b^2$ and then with the opening $b^3$. The bottom of the guideway $b'$ has a longitudinal slot $b^4$ therein, through which project loosely two studs $c^2$, formed on the slide $c$. The slide $c$ has a shank $c^3$ attached thereto, and this slide carries an expansive spring $c^4$, which serves normally to hold the slide in the position shown in Fig. 4. Mounted in the casing $a$ below the guide $b'$ is a rock-shaft $d$, one end of which is projected outside of the casing and provided with a crank-handle $d'$ to permit its operation. This shaft $d$ carries an arm $d^2$, which bears between the projections $c^2$ on the slide $c$. This shaft $d$ also carries an arm $d^3$, projecting upwardly therefrom and operating as will be hereinafter described.

Mounted to turn around an axis $e'$, fastened to the plate $b$, is a plate $e$, which supports four vertically-disposed tubes or stacks $e^2$, adapted to carry the checks which are indicated at $f$ in Fig. 4. In each tube or stack $e^2$ is located a weight $e^3$, and these weights are each provided with a transversely-projected pin $e^4$, these pins extending through vertical slots $e^5$ in the tubes $e^2$. (See Figs. 1 and 2.) The upper end of the axis $e'$ is held by a bracket $e^6$, disposed horizontally in the casing. (See Fig. 1.)

Assuming that the parts are in the position shown in Fig. 2, movement of the shaft $d$ in the direction of the arrow in Fig. 3 will cause the arm $d^2$ to impart a movement to the slide $c$. Previously one of the checks $f$ will have fallen through the lower end of the tube $e^2$, which is over the opening $b^2$ in the slideway $b'$, and also through the opening $b^2$ into the opening $c'$ in the slide $c$. The movement of the slide $c$ will therefore carry this check horizontally until the opening $b^3$ is reached, and then the check will fall through this opening onto the chute $a^3$ and be delivered to the outside of the casing $a$. When the shaft $d$ is released, the spring $c^4$ will serve to return the parts to the position shown in Fig. 4, whereupon a second check will drop into the opening $c'$ in the slide and lie there ready for a repetition of the above-described operation. Assuming that one of the tubes $e^2$ is over the opening $b^2$ of the slideway $b'$, as described, and that all of the checks have been delivered from the said tube, the pin $e^4$ of the weight $e^3$ in this tube will then engage the bottom wall of the slot $e^5$, and the further downward movement of the weight in the tube will be prevented. Previously the weight will have followed the checks down through the tube. When the pin $e^4$ is in this position, it will lie in the path of the arm $d^3$, and the arm $d^3$ striking this pin will turn the plate or disk $e$, with the attached tubes, a quarter-revolution, placing another tube $e^2$ over the opening $b^2$ in the slideway $b'$, and then the checks will be delivered from this second tube. Therefore it will be seen that as soon as the contents of one tube have been exhausted the parts will act automatically to place a second tube in position and that the checks will be withdrawn from this tube in the same manner as from the first-mentioned tube. This operation will continue until the contents of all four of the tubes have been exhausted.

For the purpose of assisting the parts $e^4$ and $d^3$ in throwing the tubes $e^2$ around the pivot $e'$ I attach to the pivot-shaft a star-wheel $k$, having four points, one for each tube $e^2$. Against this tube bears a spring-finger $l$, which is bent at its end to lie in between the points of the star-wheel. This bent end of the finger $l$ will not only serve to hold the tubes yieldingly in place, but it will by acting on the edges of the teeth of the star-wheel assist in turning the wheel and its attached parts.

If desired, various attachments may be provided for use in connection with the apparatus to afford conveniences to the customers and also to render the device attractive or amusing. Such an attachment I have illustrated in Figs. 1 and 2, in which views a drum $g$ is shown, this drum being arranged before the glass plate $a^2$ in the casing $a$ and serving to carry pictures, advertisements, legends, or other analogous matter. Fastened to the axis of the drum $g$ is a ratchet-wheel $g'$, which is engaged by a pawl $h$, carried on an arm $h'$, fastened to the shaft $d$. As the shaft $d$ is rocked a step-by-step movement is imparted to the drum, and the various devices produced thereon are successively shown through the glass plate $a^2$. A spring-arm $i$ is mounted within the casing and engages a notched wheel $i'$, fastened on the axis of the drum $g$, so as to hold the drum stationary until the force of the spring $i$ is overcome by the superior force which may be employed to drive the shaft $d$.

Various changes in the form, proportions, and minor details of my invention may be resorted to without departing from the spirit and scope thereof. Hence I consider myself entitled to all such variations as may lie within the scope of my claims.

Having thus described my invention, I claim as new and desire to secure by Letters Patent—

1. In a check-box, the combination of a slideway having openings in the top and bottom thereof, such openings being out of registry, a group of check-receptacles mounted above the slideway and capable of movement to successively present the said check-receptacles to the opening in the top of the slideway, a slide working in the slideway and having an opening capable of registering with either of the openings in the slideway, a rock-shaft, an arm on the rock-shaft, the arm engaging a part of the slide to operate the same, a second arm on the rock-shaft, means connected with the receptacle and engaged by the second arm to impart periodical movements to the check-receptacles, and means for driving the rock-shaft.

2. A check-box, having a slideway mounted therein and provided with openings in its top and bottom walls, said openings being out of registry with each other, a slide working in the slideway and having an opening therein, a group of check-receptacles movably mounted over the slideway, the check-receptacles having each a slot therein and being capable of registering successively with the opening in the top of the slideway, a weighted follower mounted in each check-receptacle and having a projection extended through the slot therein, a rock-shaft, an arm attached to the rock-shaft and serving to operate the slide, and a second arm attached to the rock-shaft, the second arm being adapted to engage the projection on the follower when the follower reaches its lowermost position, whereby to impart a movement to the said group of check-receptacles.

3. A check-box, comprising a slideway with openings in its opposite walls, an orificed slide mounted therein and adapted to move the checks therethrough to deliver the same, a group of check-receptacles mounted adjacent to the slideway and connected to move in unison to successively present themselves to the slide, a follower-weight moving in each check-receptacle, said receptacles having vertical slots therein and the follower-weights having pins projected loosely through the slots, a rock-shaft, means on the rock-shaft for actuating the slide therefrom, and an arm attached to the rock-shaft and adapted to engage with the said pins of the follower-weights to impart periodical movements to the check-receptacles.

In testimony whereof I have signed my name to this specification in the presence of two subscribing witnesses.

THOMAS FRANCES McCULLOUGH.

Witnesses:
E. S. McCARTY,
W. J. HANKER.